(12) United States Patent
Hanson et al.

(10) Patent No.: US 7,683,283 B2
(45) Date of Patent: Mar. 23, 2010

(54) DELIVERY POINT MERGE AND PACKAGING DEVICE AND METHOD OF USE

(75) Inventors: Bruce H. Hanson, Endicott, NY (US); J. Edward Roth, Lansdale, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 2056 days.

(21) Appl. No.: 10/411,198

(22) Filed: Apr. 11, 2003

(65) Prior Publication Data

US 2004/0211709 A1    Oct. 28, 2004

(51) Int. Cl.
*G06F 7/00*    (2006.01)
*G06K 9/00*    (2006.01)

(52) U.S. Cl. .......................... 209/584; 209/900; 700/223

(58) Field of Classification Search ................. 209/584, 209/900; 700/222–226; 270/52.03, 52.04; 53/202

See application file for complete search history.

(56) References Cited

U.S. PATENT DOCUMENTS

| 3,000,151 A | 9/1961 | Winkler et al. |
|---|---|---|
| 3,795,163 A | 3/1974 | Armstrong et al. |
| 3,815,321 A | 6/1974 | Hartman |
| 3,848,014 A | 11/1974 | Uchiyama et al. |
| 3,948,387 A | 4/1976 | Haertle |
| 3,973,372 A | 8/1976 | Omori |
| 4,019,947 A | 4/1977 | Stock et al. |
| 4,237,677 A | 12/1980 | Klapp |
| 4,241,559 A | 12/1980 | Klapp |
| 4,244,672 A | 1/1981 | Lund |
| 4,353,196 A | 10/1982 | Beer et al. |
| 4,570,418 A | 2/1986 | Gino |
| 4,617,784 A | 10/1986 | Golicz et al. |
| 4,676,050 A | 6/1987 | Odenthal |
| 4,676,051 A | 6/1987 | Hoskinson et al. |
| 4,683,708 A | 8/1987 | Linder |
| 4,903,459 A | 2/1990 | Okinaka |
| 4,991,376 A | 2/1991 | Backman |
| 4,999,977 A | 3/1991 | Briscoe et al. |
| 5,027,578 A | 7/1991 | Natterer et al. |
| 5,031,891 A * | 7/1991 | Kobler et al. ............ 270/52.03 |
| 5,113,639 A | 5/1992 | Bryson |
| 5,119,954 A | 6/1992 | Svyatsky et al. |

(Continued)

FOREIGN PATENT DOCUMENTS

WO    WO 02/058855 A1    8/2002

*Primary Examiner*—Patrick H Mackey
*Assistant Examiner*—Mark Hageman
(74) *Attorney, Agent, or Firm*—Leland Schultz; Greenblum & Bernstein P.L.C.

(57) ABSTRACT

A device and method for merging pre-sequenced products includes at least a first and a second feeder mechanism. The first feeder mechanism feeds a stream of first pre-sequenced product and the second feeder mechanism feeds a stream of second pre-sequenced product. A reading device reads product information of each product of the stream of the first and second pre-sequenced product. A pausing device pauses one of the first stream of pre-sequenced product and the second stream of pre-sequenced product based on the information read from the reading device. The product from one or both of the stream of first and second pre-sequenced product having the same product information is organized into a sequentially merged order.

30 Claims, 3 Drawing Sheets

U.S. PATENT DOCUMENTS

| | | |
|---|---|---|
| 5,135,352 A | 8/1992 | Scate et al. |
| 5,143,362 A * | 9/1992 | Doane et al. ............... 270/1.03 |
| 5,190,282 A | 3/1993 | Rabindran et al. |
| 5,209,043 A | 5/1993 | Kupcikevicius |
| 5,386,678 A | 2/1995 | Kujubu et al. |
| 5,588,285 A | 12/1996 | Odenthal |
| 5,615,537 A | 4/1997 | Vollenweider |
| 5,664,407 A | 9/1997 | Cooper et al. |
| 5,718,098 A | 2/1998 | Grosskopf et al. |
| 5,720,157 A * | 2/1998 | Ross ........................... 53/445 |
| 5,822,956 A | 10/1998 | Liechti et al. |
| 5,855,105 A | 1/1999 | Ferris |
| 5,934,048 A | 8/1999 | Bouressa |
| 6,107,588 A * | 8/2000 | De Leo et al. .............. 209/584 |
| 6,167,326 A * | 12/2000 | Graushar et al. ............ 700/223 |
| 6,189,294 B1 | 2/2001 | Baur |
| 6,219,994 B1 | 4/2001 | Taniguchi |
| 6,240,334 B1 * | 5/2001 | Duke et al. ................. 700/221 |
| 6,241,099 B1 | 6/2001 | Hendrickson et al. |
| 6,269,609 B2 * | 8/2001 | Graushar et al. .............. 53/168 |
| 6,303,889 B1 | 10/2001 | Hayduchok et al. |
| 6,308,493 B1 | 10/2001 | Mack et al. |
| 6,415,582 B2 | 7/2002 | Graushar et al. |
| 6,443,311 B2 | 9/2002 | Hendrickson et al. |
| 6,501,041 B1 | 12/2002 | Burns et al. |
| 6,536,191 B1 | 3/2003 | Ruggiero |
| 6,539,689 B1 | 4/2003 | Yoshimoto |
| 6,659,442 B1 | 12/2003 | Steinborn et al. |
| 6,711,462 B2 * | 3/2004 | Flores et al. ................. 700/223 |
| 6,748,294 B1 * | 6/2004 | Overman et al. ............ 700/224 |
| 6,931,816 B2 | 8/2005 | Roth |
| 7,096,088 B2 * | 8/2006 | Graushar et al. ............. 700/223 |
| 2001/0009234 A1 | 7/2001 | Hendrickson et al. |
| 2001/0011796 A1 | 8/2001 | Hendrickson et al. |
| 2001/0014270 A1 | 8/2001 | Hendrickson et al. |
| 2002/0023861 A1 | 2/2002 | Mileaf et al. |
| 2002/0074268 A1 | 6/2002 | Hendrickson et al. |
| 2004/0211709 A1 | 10/2004 | Hanson et al. |
| 2004/0218995 A1 * | 11/2004 | Graushar ........................ 412/1 |
| 2006/0071407 A1 * | 4/2006 | Graushar et al. ............. 271/204 |
| 2006/0190126 A1 * | 8/2006 | Graushar et al. ............. 700/223 |

* cited by examiner

DELIVERY POINT MERGE AND PACKAGING DEVICE AND METHOD OF USE

BACKGROUND OF THE INVENTION

1. Field of the Invention

The present invention generally relates to a merging device and, more particularly, to a delivery point merge and packaging device for merging separate streams of pre-sequenced products and a method of use.

2. Background Description

The sorting of mail is a very complex, time consuming task. In general, the sorting of mail is processed though many stages, including back end processes, which sort or sequence the mail in delivery order sequence. These processes can either be manual or automated, depending on the mail sorting facility, the type of mail to be sorted such as packages, flats, letter and the like. A host of other factors may also contribute to the automation of the mail sorting, from budgetary concerns to modernization initiatives to access to appropriate technologies to a host of other factors.

In general, however, most modern facilities have taken major steps toward automation by the implementation of a number of technologies. These technologies include, amongst others, letter sorters, parcel sorters, advanced tray conveyors, flat sorters and the like. As a result of these developments, postal facilities have become quite automated over the years, considerably reducing overhead costs.

But, in implementation, problems still exist. For example, currently, it is known to sequence letters using a mail sorter based on, for example, a two pass algorithm. Of course, other known systems can equally be used to sort letters, a host of them readily available and known to those of ordinary skill in the art. On the other hand, sequencing flats is typically performed manually using "cases". That is, flats are typically manually sequenced using cases having several hundred bins or shoots that are representative of delivery points for a route of a mail carrier. This can include, for example, 650 different delivery points. This process is very time consuming and labor intensive. For example, a person must manually read the address or delivery point for each flat and place it in the appropriate bin.

Now, to merge the pre-sequenced letters with the pre-sequenced flats can be troublesome and is usually performed using the same case for the flats in a manual process. In toto, the entire process can include three or more separate and distinct processes to merge the flats with the letters or other types of products. First, the letters are pre-sequenced using any well known method, such as the two pass algorithm. The flats are sequenced using the known manual processes. Once the flats are sequenced, the pre-sequenced letters are then manually placed within each of the respective shoots of the case, associated with the delivery point of the flat. After the letters and flats are sorted together in the case, the merged mail product is removed from the case while maintaining delivery sequence so that the merged mail products can then be further processed for delivery. This is a very time consuming, labor intensive and expensive procedure.

The present invention is directed to overcoming one or more of the problems as set forth above.

SUMMARY OF THE INVENTION

In a first aspect of the invention, a device for merging pre-sequenced products includes at least a first and a second feeder mechanism. The first feeder mechanism feeds a stream of first pre-sequenced product and the second feeder mechanism feeds a stream of second pre-sequenced product. A reading device reads product information of each product of the stream of the first and second pre-sequenced product. A pausing device pauses the first stream of pre-sequenced product or the second stream of pre-sequenced product based on the information read from the reading device. The product from one or both of the stream of first and second pre-sequenced product having the same product information is organized into a sequentially merged order.

In another aspect of the present invention, a method for merging in a sequential order a first type of product and a second type of product is provided. The steps include reading product information from a first stream of pre-sequenced products of the first type of product and reading product information from a second stream of pre-sequenced products of the second type of product. The first and second types of product of the first and second stream of pre-sequenced products having same product information are merged in sequential order.

In another aspect of the present invention, a method is provided for merging in a sequential order disparate product types. The method includes reading product information from a first and second stream of pre-sequenced products of a first and second type of product. The first and second type of product of the first and second stream of pre-sequenced product having same product information are merged into a sequential stream as determined in the reading steps. The merged sequential stream of the first and second type of product is provided to separate destinations based on delivery point segments for parallel processing such that packages are formed of the first and second type of product having the same product information. The packages are removed in delivery point sequence.

In yet another aspect of the present invention, a machine readable medium containing code for merging in a sequential order a first type of product and a second type of product is provided. The machine readable medium containing code includes a module for reading product information from a first stream of pre-sequenced products of the first type of product and a module for reading product information from a second stream of pre-sequenced products of the second type of product. This aspect further includes a module for merging in sequential order the first and second type of product of the first and second stream of pre-sequenced product having same product information.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF EMBODIMENTS OF THE INVENTION

The present invention is directed to a merging device and more particular to a device capable of merging pre-sequenced products such as, for example, flats and other mail items (i.e., letters), into a merged, sequenced stream for future delivery or warehousing or the like. In aspects of the present invention, the products may be packaged into separate deliverable packages at a downstream point, after the sequenced merge of such products. In other aspects of the present invention, the merging device is capable of providing separate streams of pre-sequenced letters and flats into sequenced streams ready for delivery by a mail carrier for a specific mail carrier route. The system and method of the present invention significantly reduces processing times for sequencing both flats and mail pieces or other disparate products in delivery point sequence using, in embodiments, parallel processing. Other applications such as warehousing and storage applications are also contemplated for use with the present invention.

Merging System of the Present Invention

Figure 1:
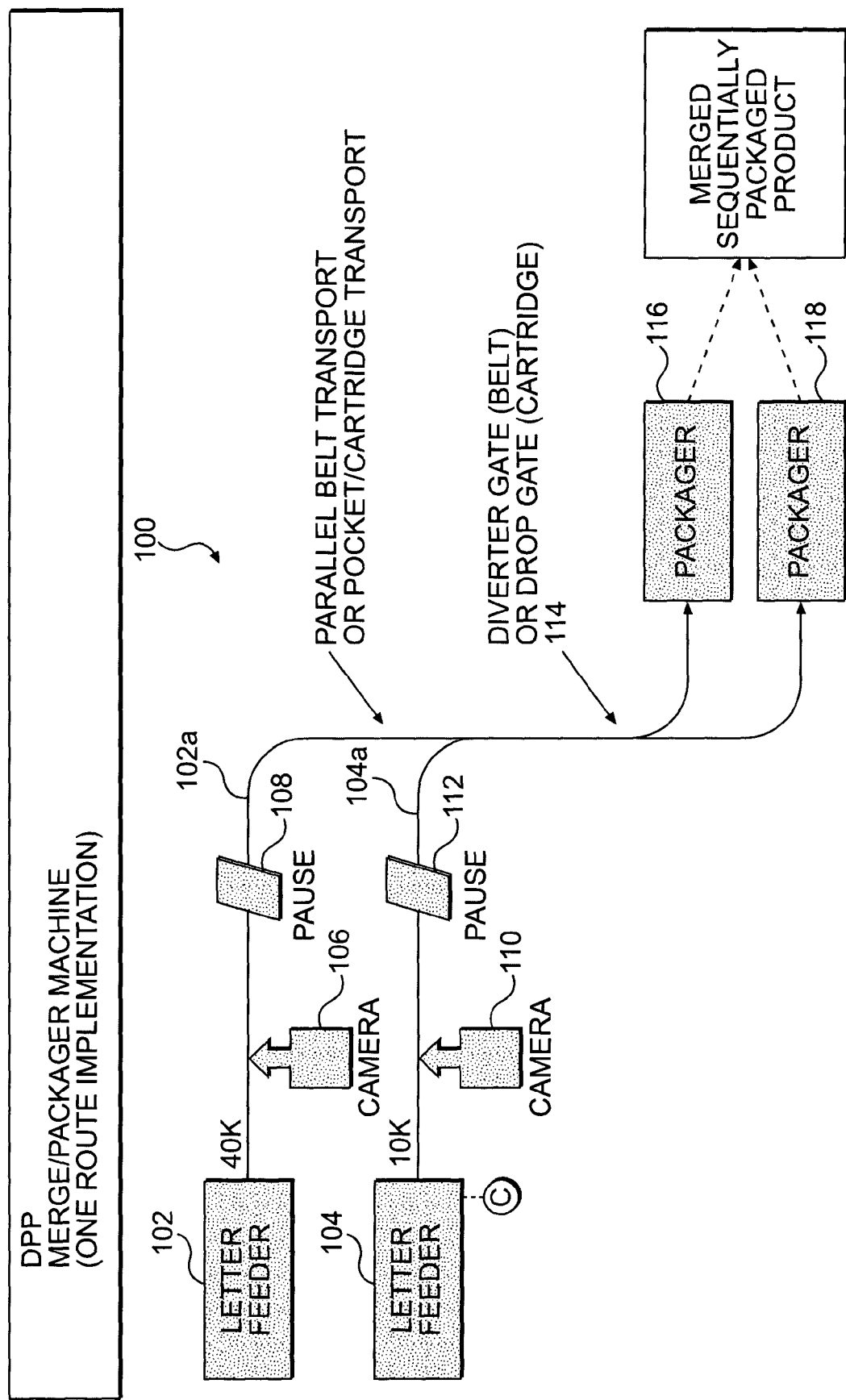
FIG. 1 shows a general schematic diagram of the merging device of the present invention.

Referring now to FIG. 1, a general schematic diagram of the merging device of the present invention is shown. In the embodiment of FIG. 1, the merging device is generally depicted as reference numeral 100 and includes a first feeder 102 and a second feeder 104. In embodiments, the first feeder 102 is a letter feeder with a feed rate capacity of approximately 40,000 letters per hour and the second feeder 104 is a flat feeder with a feed rate capacity of approximately 10,000 flats per hour. Those of ordinary skill in the art should recognize, though, that other types of feeders, feeding capacity rates and the like may also be used with the present invention, and that the feeders 102 and 104 shown in FIG. 1 are provided for illustrative purposes in describing the present invention. It should further be recognized that more than two feeders are also contemplated for use with the present invention.

Referring still to FIG. 1, two conveying tracks 102a and 104a are associated with each of the feeders 102 and 104, respectively. These conveying tracks may be parallel belt transports, pocket/cartridge transports or any other well known conveying or transporting system for transporting mail pieces, flats and the like (hereinafter referred generally as product), as described below. A camera, optical reading device or other type of reading device 106 and a pause device 108 are provided downstream of the feeder 102. Similarly, a camera, optical reading device or other type of reading device 110 and a pause device 112 are provided downstream of the feeder 104. In systems with more than two feeders, a configuration is contemplated with a respective number of reading devices and pause devices. A control "C" controlling the device of the present invention is also provided.

In embodiments, the cameras or other reading type devices 106 and 110 may be mounted to the respective conveying tracks 102a and 104a, but may be located near or proximate to the conveying tracks 102a and 104a. The cameras or reading devices 106 and 110 are designed to read the delivery point or other pertinent product information provided on each product. In aspects of the present invention, the products and hence the product information is provided in a pre-sequenced order from either highest order to lowest order or vice versa. The pause devices 108 and 112 may, similarly, be built into or located proximate to each of the respective conveying tracks to allow each type of product to be paused or stopped, at appropriate times, in the stream. The pause devices 108 and 112 may be located at a distance from the reading devices so that the bar code or other information can be interpreted before the product reaches the respective pause device 110 and 112. This allows the pause devices to pause or stop the product based upon the information associated with the bar code or other information such as area code and the like (i.e., delivery point address) of each individual product. It is at this pausing step, that products with the same information begin to be organized into a merged sequentially ordered package with the same information. One or more packagers 116 and 118 may be located downstream from the pause devices 108 and 112.

In embodiments, the conveying track 102a may be a parallel belt implementation which carries the product between two tightly adjacent parallel belts from device to device, allowing only minimal slip of the product versus belt movement. Diverters 114 may be placed between sections of the parallel belts for directing the products to the respective packager 116 and 118 or destination bin based on the product information such as delivery point. In another implementation, a flat cartridge implementation may be used which includes a transport comprising cartridges that move in a circulating manner from the feeders 102 and 104 to all destinations and then back to the feeders 102 and 104. The cartridges may each contain a number of pockets into which product are placed from the feeders, one product per pocket. At the packager destination, a door on the pocket may open, to allow the product to be ejected into a destination bin or packager.

The packager packages the products such as letters and flats, for each delivery destination. The packaging may either be a physical or defacto package. In an embodiment, the packagers 116 and 118 package the product in delivery point sequence, in an attached stream of packets, enabling the mail carrier to simply detach each sequential packet at each sequential destination. With the packages in guaranteed sequence, the effort required by the carrier at each delivery point is considerably reduced. The packagers 116 and 118 may perform the packaging of the product in parallel, as discussed below.

Figure 2:
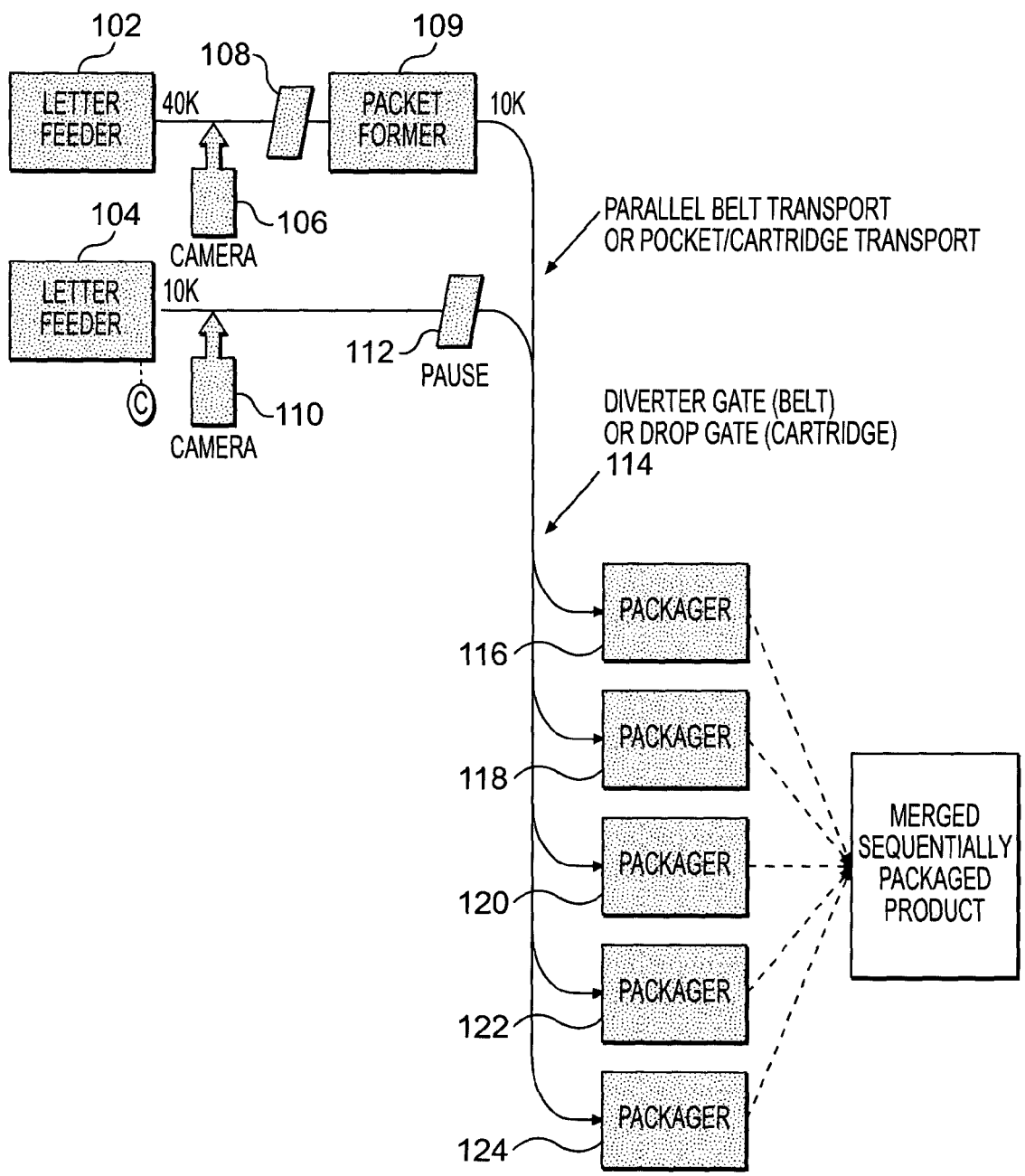
FIG. 2 shows another embodiment of the merging device of the present invention.

FIG. 2 shows another embodiment of the present invention. In this embodiment, a packet former 109 is located downstream from the feeder 102, as well as downstream from the reading device 106 and the pause device 108. In embodiments, the packet former 109, working in conjunction with the pause device 108, collects all letter mail pieces (or other product) having a same destination information (delivery point) or same product information into a packet, up to a maximum total packet thickness. The maximum packet thickness may be based on the maximum thickness that can be transported between the belts and properly diverted or transported in one cartridge pocket. The packet is then transported to its destination and ejected as a single piece into the destination bin or packager. In this embodiment, five (5) packagers are provided 116, 118, 120, 122 and 124, but more or less than this number of packagers can also be provided depending on the particular application of the present invention. This implementation provides a significant total realized throughput increase.

Method of Merging Product Using the System of the Present Invention

The system of the present invention may be used for a single carrier route at a time, multiple routes at once or for warehousing or other sequencing needs of disparate pre-sequenced products. For illustrative purposes and not to limit the present invention in any manner, a single route sequencing with letter packet implementation will be described as an illustrative example. For a single route, the optimum number of packagers to be operated in parallel can be derived based on the following assumptions for this illustrative example:

1. An average route of 650 stops (delivery points) with 4000 letters and 1000 flats.
2. Four (4) letters are packaged in each packet. This translates into processing letters for 10,000 packets per hour with a letter feeder running at 40,000 letters per hour. The time duration for processing 4000 letters into 1000 packets is 1/10 hour=6 minutes.

3. The flat feeder runs at 10,000 pieces per hour. The time duration for processing 1000 flats is 1/10 hour=6 minutes.

Using these examples as an illustration, the sort of an entire route or other purpose takes approximately 12 minutes or less. (If flats and letter packets alternate, the system of the present invention can be adjusted to sort at a significantly higher rate.) Those of ordinary skill in the art may also implement these calculations for other applications.

Given then that the illustrative route takes approximately 12 minutes to sort, it would be ideal to have enough parallel operating packagers to package at the rate of sortation. Now, assuming that a packager can complete a package cycle every 5 seconds, 12 packages can be formed in a minute. During a 12 minute period, 144 packages can be produced. For a route having 650 delivery points, thus requiring 650 packages, the need is then for five packagers, as shown in FIG. 2. But, other number of packagers can also be used, depending on the specific application. For example, four packagers could service a route having 144×4=576 delivery points.

In this illustrative example, using the five packagers translates into 130 (650/5) delivery point groups. Thus, each packager will then produce 130 delivery point sequenced packages, either physical or defacto packages. The sequenced streams of letters and flats (or other types of products) that are input are set up to take advantage of the five packagers. With the illustrative route divided into five segments, each segment will have a delivery point designation as #1, #2, . . . #130. To keep all packagers running at maximum throughput, products for delivery point #1 will be sent to all packagers, followed by mail for delivery point #2 being sent to all packagers and the like. For example, products for delivery point #1 will be provided to packagers 1, 2, 3, 4 and 5. And, if further products remain, the products will be again sent to packagers 1, 2, 3, 4 and 5, or as many required packagers needed for the corresponding number of products to be packaged. This same example may be used for all delivery points. In this way, the packagers are designed to run in parallel.

The lowest sequence number occurring in the products such as flats or letter stream should be processed onto the transport first (or vice versa). In the example using letters and flats, if the sequence numbers are the same, the letters should be processed first. However, in other illustrations, the flats may be processed first. If a delivery point for one of the segments is missed, the next delivery point for that sequence should not be advanced into the missed position, i.e., all delivery point #n product should be processed in the serial input stream before delivery point #n+1 product is encountered.

With five packagers, the mail sequence scheme for a 650 delivery point route will be as follows. It should be understood that that one or more product will be together for each delivery point shown and blanks are representative of no product to be delivered to that delivery point.

| 1 | 131 | 261 | 391 | 521 |
| 2 | 132 | 262 | 392 | 522 |
| 3 |     | 263 | 393 | 523 |
| 4 | 134 | 264 |     | 524 |
|   | 135 | 265 | 395 | 525 |
| 6 | 136 | 266 | 396 | 526 |

The following tables show as an example of the combined product, i.e., letters (L) and flats (F) mail streams as they are processed on the transport (Table 1) and provided to the packager of destination bin (Table 2) using the implementation of the present invention.

TABLE 1

Product Stream on Transport

| L1 | F1 | L131 | L261 | F261 | L391 |      | F391 | L521 | F521 |
| L2 | F2 | L132 | L262 | F262 | L392 |      | F392 | L522 | F522 |
| L3 | F3 | F133 | L263 | F263 | L393 |      | L523 | F523 |      |
| L4 |    | L134 | F134 | L264 | F264 | F394 | L524 |      |      |
| F5 |    | L135 | F135 | L265 | L395 | F395 | L525 | F525 |      |
| L6 | F6 | L136 | F136 | L266 | F266 |      | L396 | F396 | L526 | F526 |

TABLE 2

Sequentially Merged Product Stream

| Packager 1 | (L1, F1) | (L2, F2) | (L3, F3) | (L4) | (F5) | (L6, F6) |
| Packager 2 | (L131) | (L132) | (F133) | (L134, F134) | (L135, F135) | (L136, F136) |
| Packager 3: | (L261, F261) | (L262, F262) | (L263, F263) | (L264, F264) | (L265) | (L266, F266) |
| Packager 4 | (L391, F391) | (L392, F392) | (L393) | (F394) | (L395, F395) | (L396, F396) |
| Packager 5 | (L521, F521) | (L522, F522) | (L523, F523) | (L524) | (L525, F525) | (L526, F526) |

The letter and flats will be removed or ejected from the packagers in delivery point sequence. That is, packager 1 will have delivery points for 1-130, for example, packager 2 will have delivery points for 131-260 and so on.

Figure 3:
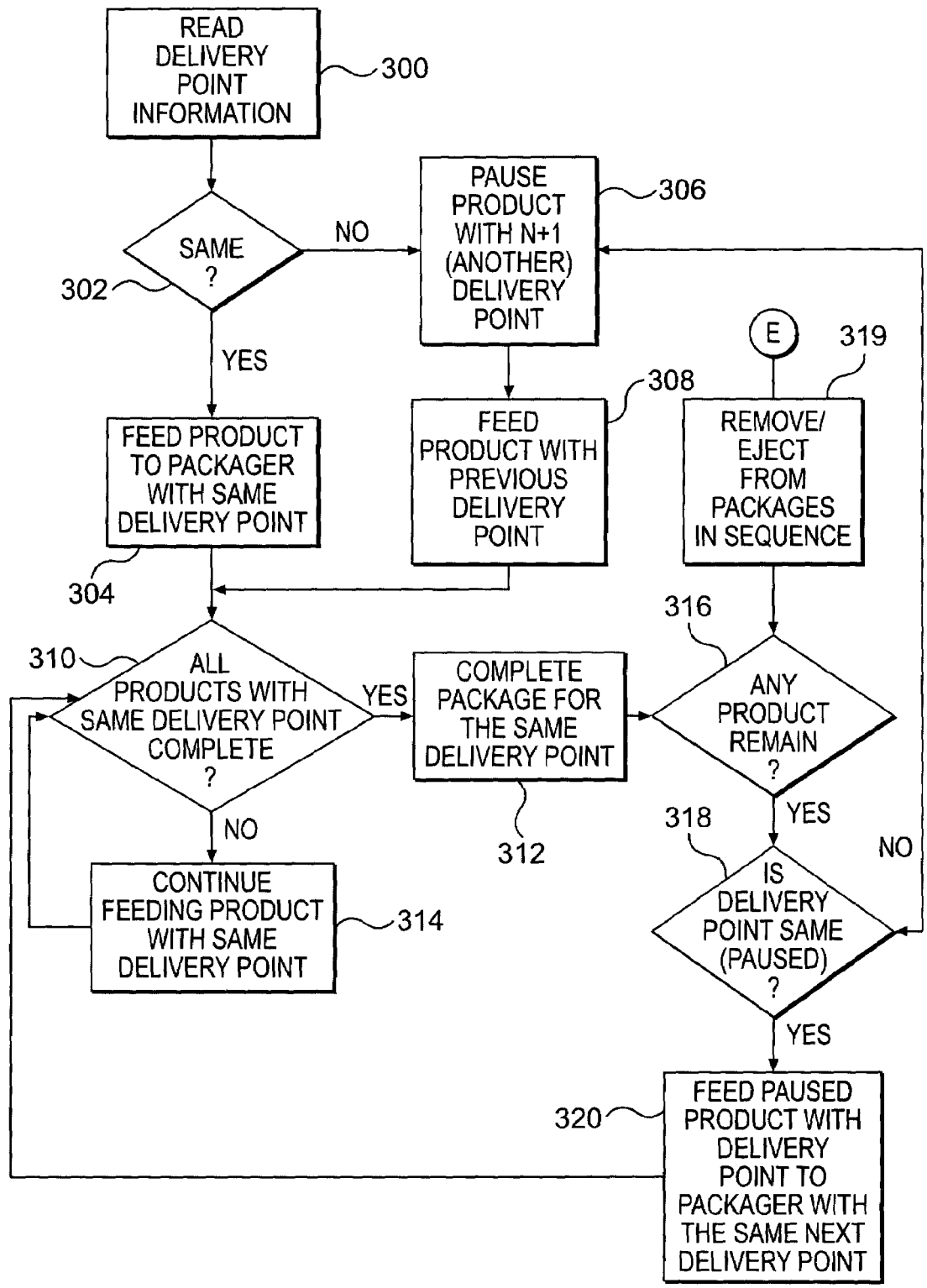
FIG. 3 is a flow diagram showing steps implementing the method of the present invention.

FIG. 3 is a flow diagram showing the steps of implementing the method of the present invention. The steps of the present invention may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). FIG. 3 may equally represent a high level block diagram of the system of the present invention, implementing the steps thereof.

In particular, in step 300, the reading devices read the destination or delivery point information or other product information (generally referred to hereinafter as delivery point information for purposes of this discussion) of the products as they are ejected from each of the feeders. In the example provided herein, a letter feeder and a flat feeder are provided as an illustrative example of the present invention; however, as previously discussed, the present invention may use more than two feeders, and other types of products may be used with such feeders. Thus, the present invention should not be limited to the use of only flats and letters, but may be used with other products such as packages and the like. It should also be recognized now that delivery point information may include any indicia, key, code (i.e., 11 digit post code) or the like for showing an association between the products such as for warehousing, storing or the like.

In step 302, a determination is made as to whether the products from both feeders include the same delivery point information. If the determination is affirmative, in step 304, the products (i.e., letters and flats) are processed through to the packagers or destination bins in a merged sequential order based on the original sequence of the products. Using the embodiment of FIG. 2, all letters or first type of product with the same delivery point information are provided in a single packet while the flats or other type of products are paused. Once the first type of product is formed into an appropriate sized packet or packets, the method of the present invention will continue with step 304. Those of ordinary skill should appreciate that all product with a different product information will be paused until the packet having product with previous delivery point information is ejected from the packet former. This entire process may assist in advancing the system when the feeder for the first type of product has a feed rate capacity greater than that of the feeder of the second type of product.

In one embodiment, in step 304, all letter(s) having the same delivery point information may be processed through to the packagers or bins, while the flat(s) for the same delivery point are paused by the pause device. Once the letter(s) are processed, the flat(s) are then processed and emptied into the bin. Of course, the present invention may process the flat(s) through the system first and then the letter(s), or both may be processed substantially simultaneously. The packagers may package the products into a single, physical package for a single delivery point.

In one aspect of the present invention, though, the products from the first and the second feeder with the same delivery point information may be formed into a "defacto" package. In this illustration, the first type of product such as letters for all of the same delivery point may be processed through to the packagers or bins. Next, all of the second type of products such as flats with the same delivery points as the previously processed letters are processed through to the packagers or bins. In this manner, the letter(s) for the first delivery point are separated from the letter(s) for another delivery point by the flat(s) having the first delivery point. A carrier can thus easily determine separate products for a single delivery point by determining the separation point between the letters and the flats, i.e., a defacto package.

If the products from the first and second feeders do not have the same delivery point information, in step 306, the product with a subsequent or different delivery point n+1 is paused (i.e., stopped) by the method of the present invention. Then, in step 308, the same type of product or products with the previous delivery point from the same feeder is processed through to the packagers or bins. It should be understood that step 304 may be eliminated in the rare instance that no products have the same delivery point.

In step 310, a determination is made as to whether all products with the same delivery point have been processed by the present invention. If yes, then, in step 312, the package of products for that delivery point is completed. The package may be either a defacto package or a physical package. If products remain with the same delivery point, then, in step 314, the transport will continue feeding the product with the same delivery point in order to provide the products in a merged sequential order to the packagers or bins. Steps 310 and 314 will repeat until a determination is made that no products remain with the same delivery point.

In step 316, a determination is made as to whether there are any products remaining. If no products remain, then in step 319, the packaged products (i.e., defacto or physical) are removed or ejected from the packagers in a merged sequential delivery point order. That is, packager 1 will eject into one or more bins (or other type of containers) its respective set of delivery points, for example, delivery points 1-130, depending on the amount of mail pieces for that set of delivery points. Similarly, packager 2 will eject into one or more bins its respective set of delivery points, for example, delivery points 131-260, depending on the amount of mail pieces for that set of delivery points, and so on. Now the bins are ejected in sequence.

The method of the present invention then ends at "E". If there are further products, a determination is then made, in step 318, as to whether a delivery point of the paused product is the same as products exiting from the other feeder. If so, the paused product, in step 306 and the remaining products with the same delivery point are processed through to the packager or bin. If there are no products from the other feeder with the same delivery point, then only the paused product (and other products from the same feeder) for that delivery point will be processed (i.e., provided in a sequential order). If there is a product with a subsequent or different delivery point n+1 from the other feeder, that product will again be paused, in step 306, and the method of the present invention will continue through at step 308. Steps 310-320 may be repeated until no further products remain and the method of the present invention ends at "E".

In embodiments of the present invention, the packagers will package the products having the same delivery point for each of their route segments in parallel, as discussed above. In this manner, the steps implemented in the flow chart of FIG. 3 may not necessarily be limited to the specific order shown. For example, steps 312 may be implemented prior to, during or after steps 316, 318 and 320. Similarly, step 314 may be performed prior to, during or after step 312, by way of example.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A device for merging pre-sequenced products, comprising:
   - at least a first feeder mechanism feeding a stream of first pre-sequenced product;
   - at least a second feeder mechanism feeding a stream of second pre-sequenced product;
   - a reading device reading product information of each product of the stream of the first and second pre-sequenced product; and
   - a pausing device pausing one of the first stream of pre-sequenced product and the second stream of pre-sequenced product based on the information read from the reading device such that product from one or both of the stream of first and second pre-sequenced product having same product information determined in the reading step is organized into a sequentially merged order.

2. The device of claim 1, further comprising a transport system for transporting the stream of first and the second pre-sequenced product past the reading device and the pausing device to a downstream destination.

3. The device of claim 1, wherein a transport system transports the product having the same product information to the downstream destination.

4. The device of claim 1, further comprising a diverter provided along the transport system, the diverter diverts the product of at least the stream of first pre-sequenced product into separate destinations.

5. The device of claim 1, wherein the at least first feeder has a feeding capacity rate greater than the at least second feeder.

6. The device of claim 1, wherein the pausing device pauses the stream of the second pre-sequenced product having the same or different product information until all of the product of the first pre-sequenced product with the same product information is processed to a downstream destination.

7. The device of claim 6, wherein the product with the same product information is formed into a defacto sequentially merged package.

8. The device of claim 1, further comprising a packager provided at a downstream destination, the packager packaging the product having the same product information into a sequentially merged package.

9. The device of claim 1, further comprising a packet former that forms a packet of the product with the same product information associated with the stream of first pre-sequenced product.

10. The device of claim 9, wherein the pausing device pauses the stream of the second pre-sequenced product until after the packet of the product with the same product information associated with the stream of first pre-sequenced product is formed into packet.

11. The device of claim 1, wherein the product information is one of destination information and sequencing information.

12. The device of claim 1, wherein:
the product having a lower order sequence number is processed prior to the product having a higher order sequence number; and
the pausing device pauses the product with the higher order sequence number until all of the product with the lower order sequence number is provided into the merged sequential order.

13. The device of claim 1, wherein the first pre-sequenced product is at least one letter and the second pre-sequenced product is at least one flat.

14. The device of claim 1, wherein the sequentially merged order of product is obtained from one of:
a portion of the stream of the first pre-sequenced product having the same information,
a portion of the stream of the second pre-sequenced stream product having the same information, and
a portion of the stream of both the first and the second pre-sequenced product having the same information.

15. The device of claim 1, further comprising at least a third feeder feeding a stream of third pre-sequenced product, wherein the reading device reads product information of each product of the stream of the first, second and third pre-sequenced product and wherein the pausing device pauses one of the first stream of pre-sequenced product, the second stream of pre-sequenced product and the third stream of pre-sequenced product based on the information read from the reading device such that product from one, both or all of the stream of the first, second and third pre-sequenced product with same product information determined in the reading step is organized into a sequentially merged order.

16. A method for merging in a sequential order a first type of product and a second type of product, the method comprising the steps of:
reading product information from a first stream of pre-sequenced products of the first type of product;
reading product information from a second stream of pre-sequenced products of the second type of product; and
pausing one of the first stream and the second stream to merge in sequential order the first and second type of product of the first and second stream of pre-sequenced product having same product information determined in the reading steps.

17. The method of claim 16, further comprising the steps of:
pausing the first stream of pre-sequenced products when the first type of product in the stream has different product information, and
continuing the merging of the second type of product having the same product information into the sequential merged order.

18. The method of claim 17, further comprising the steps of:
restarting the first stream of pre-sequenced products of the first type of product;
determining whether another product in the second stream of pre-sequenced products has the different product information;
if the determination is positive, merging in sequential order the product of the first and second stream of pre-sequenced product, in a same order; and
if the determination is negative, pausing the second stream of pre-sequenced products and passing through the first stream of pre-sequenced products all having the different product information.

19. The method of claim 16, further comprising the step of determining whether all product with the same product information has been merged into the merged sequential order.

20. The method of claim 19, further comprising packaging all the product with the same product information into a packaged merged sequential order.

21. The method of claim 19, further comprising the steps of:
forming a packet of the first type of product with the same product information;
pausing the second type of product information with the same product information; and
merging the packet with the second type of product in the second stream of pre-sequenced products having the same product information.

22. The method of claim 16, wherein the merged sequential order is based on a same ordering of the pre-sequenced order of the first and second stream of pre-sequenced products.

23. The method of claim 16, further comprising the step of packaging in parallel different route segments associated with the sequentially ordered first and second type of product.

24. The method of claim 23, further comprising providing the packages for the different route segments in a sequential delivery point order.

25. The method of claim 16, further comprising:
merging in a sequential order the first type of product, the second type of product and a third type of product including the steps of:
reading product information from the first stream of pre-sequenced products of the first type of product, the second stream of pre-sequenced products of the second type of product and a third stream of pre-sequenced products of the third type of product; and
merging in sequential order the first, second and third type of product of the first, second and third stream of pre-sequenced product with the same product information as determined in the reading step.

26. A method for merging in a sequential order a first type of product and a second type of product, the method comprising the steps of:
reading product information from a first stream of pre-sequenced products of the first type of product:
reading product information from a second stream of pre-sequenced products of the second type of product:

pausing one of the first stream and the second stream to merge in sequential order the first and second type of product of the first and second stream of pre-sequenced product having same product information determined in the reading steps;

passing the first type of product of the first stream of pre-sequenced products with the same product information to a destination bin;

pausing the second stream of pre-sequenced products of the second type of product having the same product information until all of the first type of the product has been provided to the destination bin; and moving the second stream of pre-sequenced products of the second type having the same product information to the destination bin thereby forming a defacto package.

27. A method for merging in a sequential order disparate product types comprising the steps of:

reading product information from a first stream of pre-sequenced products of the first type of product;

reading product information from a second stream of pre-sequenced products of the second type of product; and pausing one of the first stream and the second stream to merge into a sequential stream the first and second type of product of the first and second stream of pre-sequenced product having same product information as determined in the reading steps;

providing the merged sequential stream of the first and second type of product to separate destinations based on delivery point segments for parallel processing such that packages are formed of the first and second type of product having the same product information; and removing the formed packages in delivery point sequence.

28. The method of claim 27, further comprising the steps of:

pausing the first stream of pre-sequenced products when the first type of product in the stream has different product information, continuing the merging of the second type of product having the same product information into the sequential stream;

restarting the first stream of pre-sequenced products of the first type of product;

determining whether another product in the second stream of pre-sequenced products has the different product information;

if the determination is positive, merging in sequential order the product of the first and second stream of pre-sequenced product, in a same order; and if the determination is negative, pausing the second stream of pre-sequenced products and passing through the first stream of pre-sequenced products all having the different product information.

29. The method of claim 27, further comprising the steps of:

forming a packet of the first type of product with the same product information;

pausing the second type of product information with the same product information; and merging the packet with the second type of product in the second stream of pre-sequenced products having the same product information.

30. A machine readable medium containing code for merging in a sequential order a first type of product and a second type of product, comprising:

a module for reading product information from a first stream of pre-sequenced products of the first type of product;

a module for reading product information from a second stream of pre-sequenced products of the second type of product; and a module for merging in sequential order the first and second type of product of the first and second stream of pre-sequenced product having same product information.

* * * * *